United States Patent
Min et al.

(10) Patent No.: US 8,724,915 B2
(45) Date of Patent: May 13, 2014

(54) IMAGE ENCODING AND DECODING METHOD AND APPARATUS USING TEXTURE SYNTHESIS

(75) Inventors: Jung-hye Min, Yongin-si (KR); Woo-jin Han, Suwon-si (KR); Jeong-hoon Park, Seoul (KR); Yu-mi Sohn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1177 days.

(21) Appl. No.: 11/961,140

(22) Filed: Dec. 20, 2007

(65) Prior Publication Data

US 2008/0152243 A1 Jun. 26, 2008

Related U.S. Application Data

(60) Provisional application No. 60/870,967, filed on Dec. 20, 2006.

(30) Foreign Application Priority Data

Mar. 26, 2007 (KR) .................. 10-2007-0029370

(51) Int. Cl.
*G06K 9/36* (2006.01)

(52) U.S. Cl.
USPC ........... 382/243; 382/233; 382/232; 382/108; 345/582; 345/583; 345/587

(58) Field of Classification Search
USPC ......... 382/162, 164, 165, 166, 173, 175, 180, 382/190, 191, 192, 199, 203, 204, 205, 206, 382/232, 233, 243, 246, 254, 108, 156, 240, 382/251; 348/575, 576, 578, 571, 128, 348/394.1, 395.1; 345/427, 582, 583, 587, 345/600, 605, 619, 689, 571; 358/2.1, 453, 358/538, 448, 458, 467; 375/240.24
See application file for complete search history.

(56) References Cited

U.S. PATENT DOCUMENTS

| | | | |
|---|---|---|---|
| 5,533,140 A | 7/1996 | Sirat et al. | |
| 5,612,744 A * | 3/1997 | Lee et al. | 348/416.1 |
| 6,055,274 A * | 4/2000 | McVeigh | 375/240.16 |

(Continued)

FOREIGN PATENT DOCUMENTS

| | | |
|---|---|---|
| JP | 05328325 A | 12/1993 |
| JP | 08-275158 A | 10/1996 |
| JP | 2006519533 A | 8/2006 |
| WO | 03/092297 A1 | 11/2003 |

OTHER PUBLICATIONS

Yanwen Guo, "Studies on Texture Mapping, Synthesis, and Replacement", Doctoral Dissertations, published on Sep. 16-Oct. 16 presented on Mar. 29, 2006, pages 25.*

(Continued)

*Primary Examiner* — Mekkonen Bekele
(74) *Attorney, Agent, or Firm* — Sughrue Mion, PLLC (57) ABSTRACT

Provided is an image encoding/decoding method and apparatus. In the image encoding method, a portion of a texture region included in a current picture is selected as a sample texture for synthesizing the texture region and only the sample texture is encoded in place of the texture region, thereby improving the compression efficiency of encoding with respect to the texture region and thus improving the compression efficiency of encoding with respect to the entire image.

6 Claims, 7 Drawing Sheets

(56) References Cited

U.S. PATENT DOCUMENTS

| | | | |
|---|---|---|---|
| 6,556,210 B1* | 4/2003 | Yamamoto et al. | 345/582 |
| 6,977,659 B2 | 12/2005 | Dumitras et al. | |
| 7,606,435 B1* | 10/2009 | Dumitras et al. | 382/243 |
| 8,401,319 B2* | 3/2013 | Dumitras et al. | 382/243 |
| 2003/0021343 A1* | 1/2003 | Trovato | 375/240.08 |
| 2003/0076334 A1* | 4/2003 | Dumitras et al. | 345/582 |
| 2005/0243099 A1 | 11/2005 | Dumitras et al. | |
| 2006/0039617 A1* | 2/2006 | Makai et al. | 382/232 |
| 2006/0062456 A1 | 3/2006 | Chiu et al. | |
| 2006/0284880 A1* | 12/2006 | Zhou et al. | 345/582 |
| 2007/0160298 A1* | 7/2007 | Murakami et al. | 382/238 |
| 2007/0268301 A1* | 11/2007 | Dumitras et al. | 345/582 |
| 2008/0205518 A1* | 8/2008 | Wilinski et al. | 375/240.08 |
| 2009/0116760 A1* | 5/2009 | Boon et al. | 382/238 |
| 2009/0185747 A1* | 7/2009 | Segall et al. | 382/220 |
| 2013/0286032 A1* | 10/2013 | Dumitras et al. | 345/582 |

OTHER PUBLICATIONS

Guo et al.,"Image and video retexturing" Computer Animation and Virtual Worlds, 2005 John Wiley & Sons, Ltd. pp. 452-461.*

Yanwen Guo, "Studies on Texture Mapping, Synthesis, and Replacement", Doctoral Dissertations, published on Sep. 16-Oct. 16 presented on Mar. 29, 2006, pp. 25.*

Yanwen Guo, "Studies on Texture Mapping, Synthesis and Replacement", 2006, pp. 1-8.

Office Action issued Feb. 9, 2011 in counterpart Chinese Application No. 200780047717.X.

Office Action issued on Oct. 17, 2011 by the State Intellectual Property Office of the P.R. of China in corresponding Chinese Patent Application No. 200780047717.X.

Japanese Office Action, dated Aug. 14, 2012, issued in corresponding Japanese Patent Application No. 2009-542635.

Communication dated Jan. 8, 2013, issued by the Japanese Patent Office in counterpart Japanese Patent Application No. 2009-542635.

Communication, dated Sep. 30, 2013, issued by the Korean Intellectual Property Office in counterpart Korean Patent Application No. 10-2007-0029370.

Communication dated Dec. 31, 2013, issued by the Korean Intellectual Property Office in counterpart Korean Application No. 10-2007-0029370.

* cited by examiner

IMAGE ENCODING AND DECODING METHOD AND APPARATUS USING TEXTURE SYNTHESIS

CROSS-REFERENCE TO RELATED PATENT APPLICATION

This application claims the benefit of Korean Patent Application No. 10-2007-0029370, filed on Mar. 26, 2007, in the Korean Intellectual Property Office, and the benefit of U.S. Provisional Patent Application No. 60/870,967, filed on Dec. 20, 2006 in the U.S. Patent and Trademark Office, the disclosures of which are incorporated herein in their entirety by reference.

BACKGROUND OF THE INVENTION

1. Field of the Invention

Apparatuses and methods consistent with the present invention relate to image encoding and decoding, and more particularly, to efficiently encoding and decoding an image including a texture region.

2. Description of the Related Art

In a picture, a region regarded as having homogeneousness and a specific pattern such as a unique figure or unique texture is referred to as a texture. A task of extracting statistical features of a texture or dividing a picture into different regions according to disparity in texture is called texture analysis.

In contrast to texture analysis, texture synthesis refers to synthesizing a new texture of a predetermined size from a texture of a small size. Various algorithms for texture synthesis such as "Texture synthesis by non-parametric sampling" by A. A. Efros and T. K. Leung in Proceedings of the Seventh International Conference on Computer Vision, Corfu, Greece, 1999 have been suggested. Using a sample texture of a small size included in a texture region, a texture of a predetermined size, which has the same pattern, i.e., the same figure and texture as those of the sample texture, is synthesized.

Figure 1:
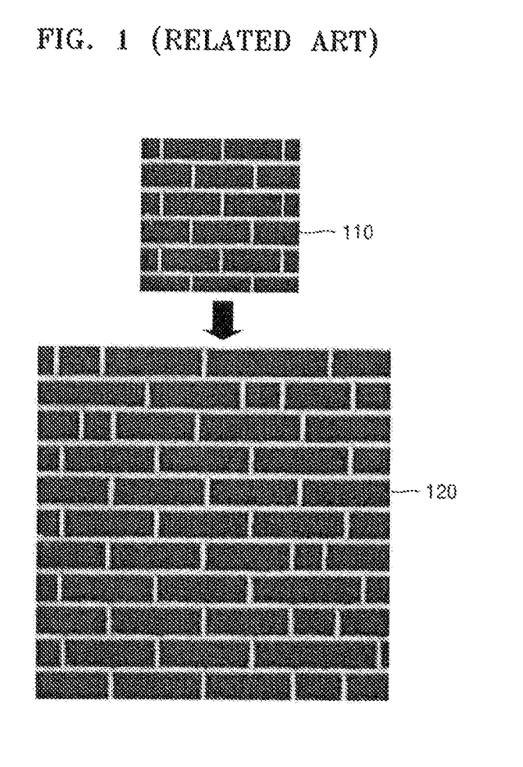
FIG. 1 is a view for explaining conventional texture synthesis.

FIG. 1 is a view for explaining conventional texture synthesis.

Referring to FIG. 1, using a regular brick-patterned sample texture 110, a brick-patterned texture 120 of a larger size than that of the sample texture 110 is synthesized. As the size of the sample texture 110 increases, the pattern of the synthesized texture 120 may become more similar to that of the sample texture 110.

A texture included in an image degrades the efficiency of image compression. In particular, a texture such as grass or a wave, which is repeated unpredictably, is difficult to predict using interprediction or intraprediction during encoding. In other words, such a texture is not easy to predict using temporal/spatial redundancy in an image, making it difficult to perform compression encoding on the image based on the prediction result.

Therefore, there is a need for an image encoding and decoding method capable of compressing an image with high efficiency using the homogeneousness of a texture region.

SUMMARY OF THE INVENTION

The present invention provides a method and apparatus for image encoding and decoding using texture synthesis and a computer-readable recording medium having recorded thereon a program for executing the method.

According to one aspect of the present invention, there is provided an image encoding method including detecting a texture region in a current picture, selecting a portion of the detected texture region as a sample texture for synthesizing the texture region, and encoding the selected sample texture in place of the detected texture region.

The encoding of the selected sample texture may include encoding position information of the detected texture region and position information of the selected sample texture in the current picture.

According to another aspect of the present invention, there is provided an image encoding apparatus including a texture region detection unit detecting a texture region in a current picture, a sample texture selection unit selecting a portion of the detected texture region as a sample texture for synthesizing the texture region, and an encoding unit encoding the selected sample texture in place of the detected texture region.

According to another aspect of the present invention, there is provided an image decoding method including receiving data regarding a current picture in which a portion of a texture region included in the current picture is selected as a sample texture for synthesizing the texture region and the sample texture is encoded in place of the texture region, decoding the sample texture from the received data regarding the current picture, synthesizing the texture region using the decoded sample texture, and disposing the synthesized texture region in the current picture.

According to another aspect of the present invention, there is provided an image decoding apparatus including a decoding unit receiving data regarding a current picture in which a portion of a texture region included in the current picture is selected as a sample texture for synthesizing the texture region and the sample texture is encoded in place of the texture region, and decoding the sample texture from the received data regarding the current picture, a texture region synthesis unit synthesizing the texture region using the decoded sample texture, and a disposition unit disposing the synthesized texture region in the current picture.

According to another aspect of the present invention, there is provided an image encoding method including detecting M pictures, each of which includes a texture region of a particular pattern, from an image, selecting N pictures whose texture regions are to be encoded from among the M detected pictures, and encoding only the texture region included in each of the N selected pictures among the texture regions included in the M pictures.

According to another aspect of the present invention, there is provided an image encoding apparatus including a pattern detection unit detecting M pictures, each of which includes a texture region of a particular pattern, from an image, a picture selection unit selecting N pictures whose texture regions are to be encoded from among the M detected pictures, and an encoding unit encoding only the texture region included in each of the N selected pictures among the texture regions included in the M pictures.

According to another aspect of the present invention, there is provided an image decoding method including receiving image data in which M pictures, each of which includes a texture region of a particular pattern, are detected in an image, N pictures whose texture regions are to be encoded are selected from among the M detected pictures, and only the texture region included in each of the N selected pictures among the texture regions included in the M pictures is encoded, decoding the texture region included in each of the N pictures from the received image data, and reconstructing the texture region included in each of the remaining pictures of the M pictures except for the N pictures using the texture region included in each of the N pictures.

According to another aspect of the present invention, there is provided an image decoding apparatus including a decoding unit receiving image data in which M pictures, each of which includes a texture region of a particular pattern, are detected in an image, N pictures whose texture regions are to be encoded are selected from among the M detected pictures, and only the texture region included in each of the N selected pictures among the texture regions included in the M pictures is encoded, and decoding the texture region included in each of the N pictures from the received image data, and a texture region reconstruction unit reconstructing the texture region included in each of the remaining pictures of the M pictures except for the N pictures using the texture region included in each of the N pictures.

According to another aspect of the present invention, there is provided a computer-readable recording medium having recorded thereon a program for executing the image encoding methods and the image decoding methods.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the accompanying drawings. It should be noticed that like reference numerals refer to like elements illustrated in one or more of the drawings. In the following description of the present invention, a detailed description of known functions and configurations incorporated herein will be omitted for conciseness and clarity.

Figure 2:
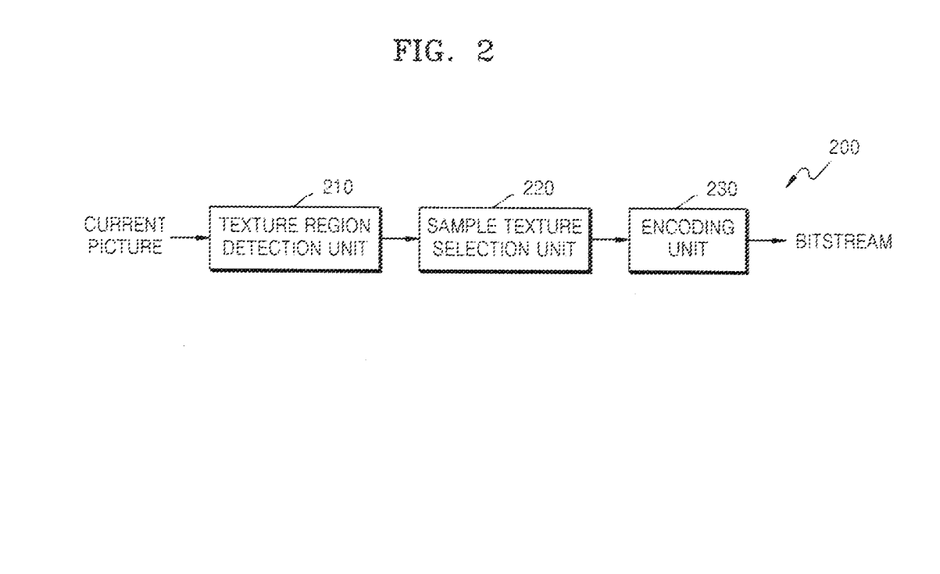
FIG. 2 is a block diagram of an image encoding apparatus according to an exemplary embodiment of the present invention.

FIG. 2 is a block diagram of an image encoding apparatus 200 according to an exemplary embodiment of the present invention.

Referring to FIG. 2, the image encoding apparatus 200 includes a texture region detection unit 210, a sample texture selection unit 220, and an encoding unit 230.

The texture region detection unit 210 detects a texture region in the current picture. If an image corresponding to grass is a texture region 310 in the current picture 300 illustrated in FIG. 3, the texture region detection unit 210 detects and separates the texture region 310 from the current picture 300 through texture analysis.

Figure 3:
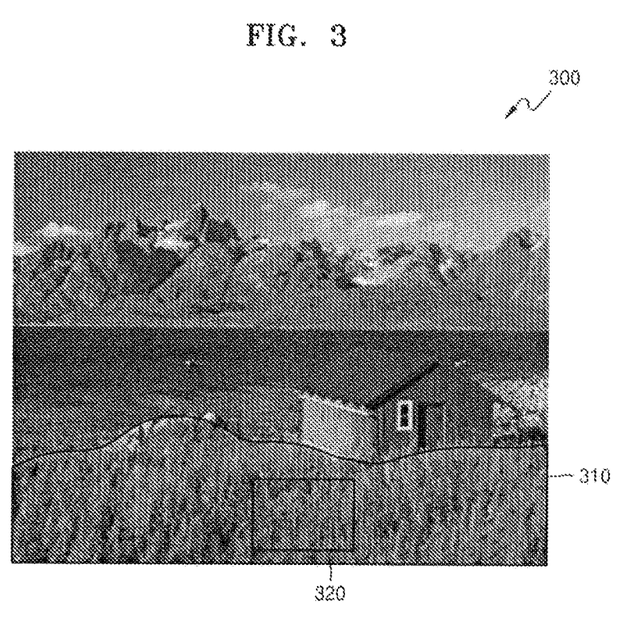
FIG. 3 is a view for explaining texture analysis according to an exemplary embodiment of the present invention.

The sample texture selection unit 220 selects a portion of the detected texture region 310 as a sample texture 320. The image encoding apparatus 200 according to an exemplary embodiment of the present invention encodes only a portion of the detected texture region 310, i.e., the sample texture 320 selected by the sample texture selection unit 220, in place of the entire texture region 310.

Thus, the sample texture selection unit 220 selects a portion of the texture region 310 as the sample texture 320 required for synthesizing the texture region 310. The size of the sample texture 320 is not limited, but as the size of the sample texture 320 increases, an image decoding apparatus for decoding the current picture 300 is likely to synthesize a texture region 310 that is more similar to the original one.

The encoding unit 230 encodes the sample texture 320 selected by the sample texture selection unit 220, in place of the texture region 310 of the current picture 300. The encoding unit 230 encodes the remaining portion of the current picture 300 except for the texture region 310 according to a general image encoding method. However, for the texture region 310, the encoding unit 230 encodes only the sample texture 320 selected by the sample texture selection unit 220.

The encoding unit 230 may perform predictive encoding on the sample texture 320 of the current picture 300 for compression. More specifically, the encoding unit 230 generates a prediction value for the sample texture 320 by performing temporal prediction from a previously encoded reference picture and encodes a residual that is obtained by subtracting the generated prediction value from the sample texture 320.

An image decoding apparatus can reconstruct the current picture 300 only when blocks included in the texture region 310 and blocks included in the sample texture 320 are specified. To this end, the encoding unit 230 has to also encode position information of the texture region 310 in the current picture 300, which will be hereinafter referred to as texture region position information, and position information of the sample texture 320 in the current picture 300, which will be hereinafter referred to as sample texture position information. Thus, the encoding unit 230 inserts information about the blocks included in the texture region 310 and information about the blocks included in the sample texture 320 into a bitstream, thereby encoding the texture region position information and the sample texture position information.

Figure 4:
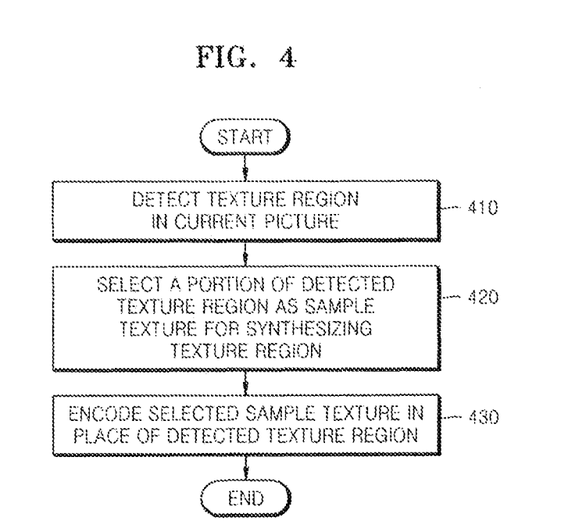
FIG. 4 is a flowchart of an image encoding method according to an exemplary embodiment of the present invention.

FIG. 4 is a flowchart of an image encoding method according to an exemplary embodiment of the present invention.

In operation 410, the image encoding apparatus 200 according to an exemplary embodiment of the present invention detects a texture region in the current picture.

In operation 420, the image encoding apparatus 200 selects a portion of the texture region detected in operation 410 as a sample texture for synthesizing the texture region. In other words, a sample texture to be encoded in place of the texture region is selected. Only the sample texture is encoded and is transmitted to an image decoding apparatus and the image decoding apparatus synthesizes the entire texture region in the sample texture.

In operation 430, the image encoding apparatus 200 encodes the sample texture selected in operation 420. Preferably, only a residual may be encoded by temporal prediction. Texture region position information and sample texture position information may also be encoded and inserted into a bitstream.

Figure 5:
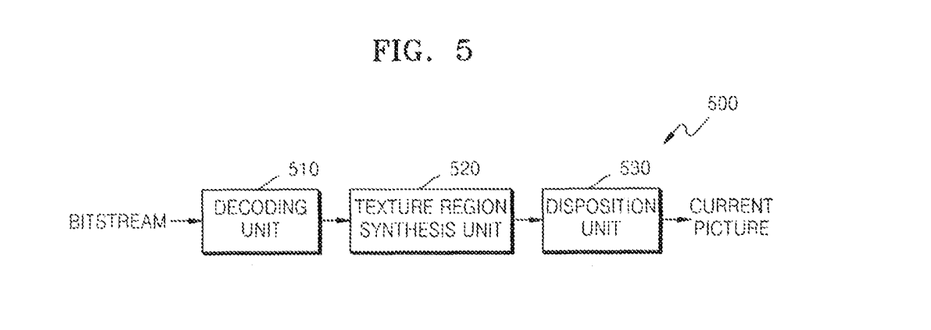
FIG. 5 is a block diagram of an image decoding apparatus according to an exemplary embodiment of the present invention.

FIG. 5 is a block diagram of an image decoding apparatus 500 according to an exemplary embodiment of the present invention.

Referring to FIG. 5, the image decoding apparatus 500 includes a decoding unit 510, a texture region synthesis unit 520, and a disposition unit 530.

The decoding unit 510 receives a bitstream including data regarding the current picture and decodes a sample texture from the received bitstream.

More specifically, the decoding unit 510 receives data regarding the current picture in which a texture region included in the current picture is detected, the sample texture is selected from the detected texture region, and only the selected sample texture is encoded in place of the texture region. The decoding unit 510 decodes the sample texture from the received data regarding the current picture.

Since the bitstream includes texture region position information and sample texture position information, the decoding unit 510 also decodes the texture region position information and the sample texture position information.

The texture region synthesis unit 520 synthesizes the texture region using the sample texture decoded by the decoding unit 510. More specifically, the texture region synthesis unit 520 synthesizes the texture region having the same pattern, i.e., the same figure and texture as those of the sample texture.

For the texture region that may cause the compression inefficiency of encoding, the sample texture is selected from the texture region and is encoded and the image decoding apparatus 500 synthesizes the texture region using texture synthesis, thereby improving the compression efficiency of encoding.

The disposition unit 530 disposes the texture region synthesized by the texture region synthesis unit 520 in the current picture. By referring to the texture region position information and the sample texture position information, which are included in the bitstream and are decoded by the decoding unit 510, the disposition unit 530 disposes the synthesized texture region in the current picture.

The decoding unit 510 decodes the remaining portion of the current picture except for the texture region according to a general decoding method and mixes the decoded remaining portion with the texture region synthesized by the texture region synthesis unit 520, thereby reconstructing the current picture.

Figure 6:
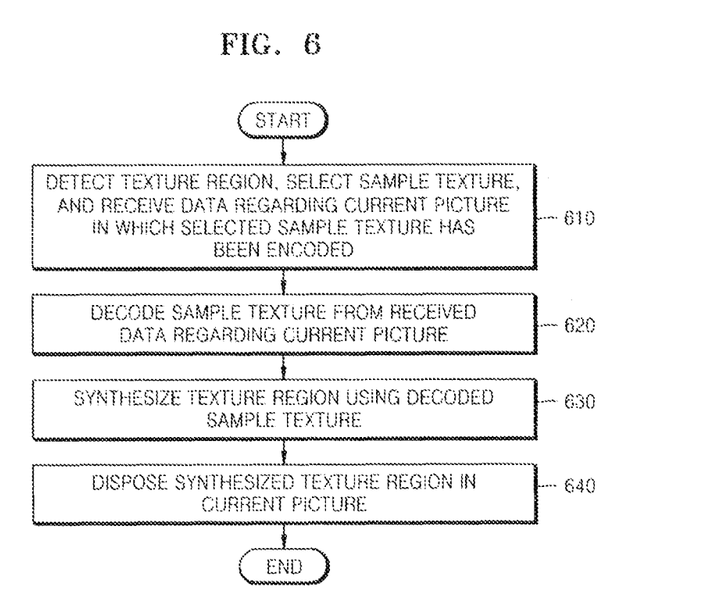
FIG. 6 is a flowchart of an image decoding method according to an exemplary embodiment of the present invention.

FIG. 6 is a flowchart of an image decoding method according to an exemplary embodiment of the present invention.

Referring to FIG. 6, the image decoding apparatus 500 according to an exemplary embodiment of the present invention receives data regarding the current picture in which a texture region included in the current picture is detected, a sample texture is selected from the detected texture region, and only the sample texture is encoded in place of the texture region, in operation 610.

In operation 620, the image decoding apparatus 500 decodes the sample texture from the data regarding the current picture received in operation 610. When the sample texture is predictive-encoded from a reference picture using temporal prediction, the image decoding apparatus 500 generates a prediction value for the sample texture by referring to the reference picture and adds a residual to the generated prediction value, thereby decoding the sample texture.

In operation 630, the image decoding apparatus 500 synthesizes the texture region using the sample texture decoded in operation 620.

In operation 640, the image decoding apparatus 500 disposes the texture region synthesized in operation 630 in the current picture. In other words, the image decoding apparatus 500 disposes the synthesized texture region in the current picture by referring to texture region position information and sample texture position information, which are included in the bitstream.

Figure 7:
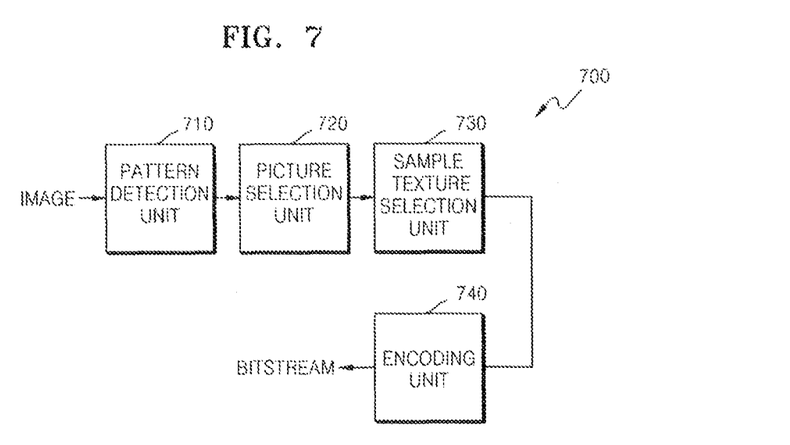
FIG. 7 is a block diagram of an image encoding apparatus according to another exemplary embodiment of the present invention.

FIG. 7 is a block diagram of an image encoding apparatus 700 according to another exemplary embodiment of the present invention.

Referring to FIG. 7, the image encoding apparatus 700 includes a pattern detection unit 710, a picture selection unit 720, a sample texture selection unit 730, and an encoding unit 740.

The pattern detection unit 710 detects M pictures, i.e., a plurality of pictures, each of which has a texture region of a particular pattern, from an image. In other words, the pattern detection unit 710 detects pictures, each of which includes a texture region having a particular pattern, i.e., a texture region having a particular figure or texture, using texture analysis.

In an image composed of consecutive pictures, a plurality of pictures, each of which includes a texture region of a particular pattern, may exist. The pattern detection unit 710 performs texture analysis on the image in order to detect a plurality of temporally consecutive pictures, each of which includes a texture region of a particular pattern, as will be described in detail with reference to FIG. 8.

Figure 8:
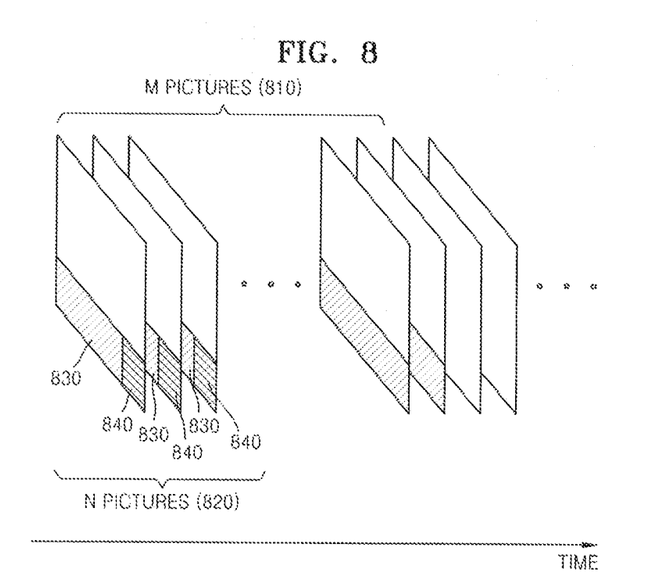
FIG. 8 is a view for explaining texture analysis according to another exemplary embodiment of the present invention.

As illustrated in FIG. 8, an image composed of consecutive pictures may include texture regions 830 of a particular pattern for a specific period of time. If each of M pictures 810 includes the texture region 830, the pattern detection unit 710 performs texture analysis in order to detect the M pictures 810 including the texture regions 830.

The picture selection unit 720 selects N pictures whose texture regions are to be encoded from among the M pictures 810 detected by the pattern detection unit 710. Since the same texture region 830 of a particular pattern is included in each of the M detected pictures 810, it is not necessary to separately encode the texture region 830 included in each of the M detected pictures 810. Thus, the picture selection unit 720 selects only the N pictures 820 whose texture regions 830 are to be encoded from among the M pictures 810.

The selection of the N pictures 820 may be performed, by selecting N temporally preceding pictures from among the M pictures 810 detected by the pattern detection unit 710, but is not limited to this.

The sample texture selection unit 730 selects a sample texture for each of the texture regions 830 included in the N pictures 820 selected by the sample texture selection unit 730. Although the compression efficiency of encoding can be improved by encoding the texture regions 830 included in the N pictures 820 selected from among the M pictures 810, the image encoding apparatus 700 according to another exemplary embodiment of the present invention selects a sample texture 840 for each of the texture regions 830 included in the N selected pictures 820.

An image decoding apparatus decodes the texture region 830 included in each of the N pictures 820 using the sample texture 840 and reconstructs the texture regions 830 for the remaining (M-N) pictures 810 using the decoded texture regions 830.

The encoding unit 740 encodes only the texture region 830 included in each of the N pictures 820 that are selected by the picture selection unit 720 from among the M pictures 810 detected by the pattern detection unit 710. More specifically, the encoding unit 740 encodes only the sample texture 840 that is selected by the sample texture selection unit 730 from each of the texture regions 830 included in the N pictures 820.

Temporal redundancy is removed by selecting some of the M pictures 810 having the texture regions 830 of a particular pattern, i.e., the N pictures 820, and spatial redundancy in each of the N pictures 820 is removed by selecting the sample texture 840 for each of the N selected pictures 820.

As previously described regarding the encoding unit 230 illustrated in FIG. 2, position information of the texture region 830 included in each of the M pictures 810 (texture region position information) and position information of the sample texture 840 included in each of the N pictures 820 (sample texture position information) are encoded by the encoding unit 740 and are inserted into a bitstream.

Figure 9:
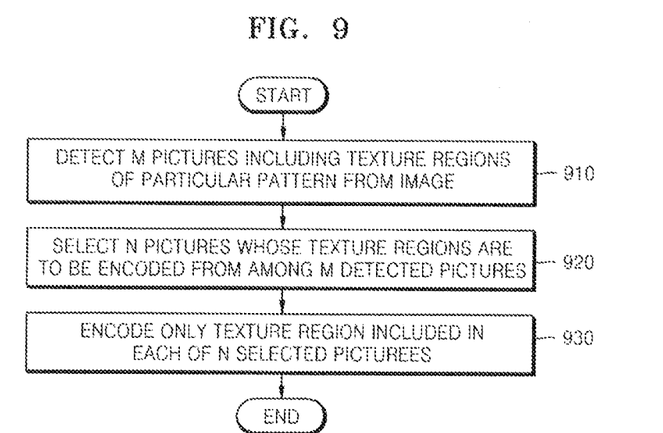
FIG. 9 is a flowchart of an image encoding method according to another exemplary embodiment of the present invention.

FIG. 9 is a flowchart of an image encoding method according to another exemplary embodiment of the present invention.

Referring to FIG. 9, the image encoding apparatus 700 according to another exemplary embodiment of the present invention detects M pictures, each of which includes a texture region of a particular pattern, from an image in operation 910. In other words, the image encoding apparatus 700 performs texture analysis in order to detect the M pictures, each of which includes a texture region of a particular pattern, i.e., a texture region having a particular figure or texture.

In operation 920, the image encoding apparatus 700 selects N pictures whose texture regions are to be encoded from among the M pictures detected in operation 910. The image encoding apparatus 700 may select N temporally preceding pictures from among the M pictures detected in operation 910.

In operation 930, the image encoding apparatus 700 encodes texture regions included in only the N pictures selected in operation 920. Preferably, the image encoding apparatus 700 selects a sample texture for each of the texture regions included in the N pictures and encodes the selected sample textures.

Figure 10:
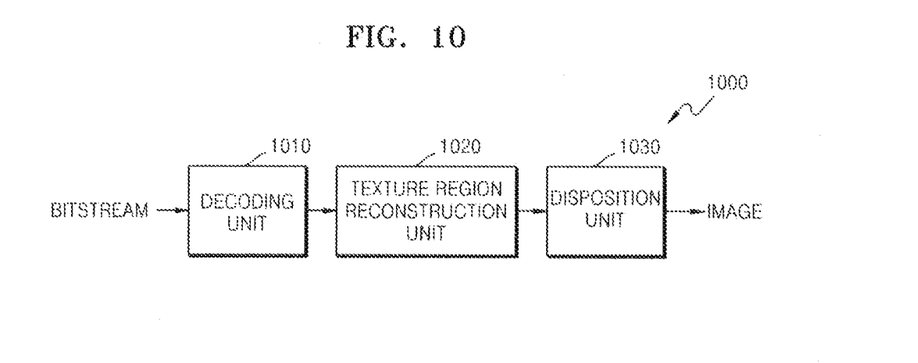
FIG. 10 is a block diagram of an image decoding apparatus according to another exemplary embodiment of the present invention.

FIG. 10 is a block diagram of an image decoding apparatus 1000 according to another exemplary embodiment of the present invention.

Referring to FIG. 10, the image decoding apparatus 1000 includes a decoding unit 1010, a texture region reconstruction unit 1020, and a disposition unit 1030.

The decoding unit 1010 receives image data in which M pictures, each of which includes a texture region of a particular pattern, are detected, N pictures are selected from among the M detected pictures, and only texture regions included in the N pictures are encoded, and decodes the texture region included in each of the N pictures from the received image data.

The decoding unit 1010 may receive image data in which a sample texture for each of the texture regions included in the N pictures is selected and encoded, and decode the sample textures.

The texture region reconstruction unit 1020 reconstructs the texture regions included in the remaining pictures of the M pictures, i.e., in the (M-N) pictures, using the decoded texture regions included in the N pictures.

More specifically, the texture region reconstruction unit 1020 reconstructs the texture regions included in the remaining (M-N) pictures by performing temporal prediction using the texture regions included in the N pictures.

When a sample texture is decoded in each of the texture regions included in the N pictures, each of the texture regions included in the N pictures is synthesized using the decoded sample texture and the texture regions included in the remaining (M-N) pictures are reconstructed using the synthesized texture region included in each of the N pictures.

The disposition unit 1030 disposes the reconstructed texture region included in each of the M pictures, thereby reconstructing the M pictures. The texture region included in each of the N pictures, which has been decoded by the decoding unit 1010, and the texture region included in each of the (M-N) pictures, which has been decoded by the texture region reconstruction unit 1020, are disposed in each of the M pictures. The disposition unit 1030 disposes the texture regions by referring to texture region position information and sample texture position information, which are included in the bitstream.

Figure 11:
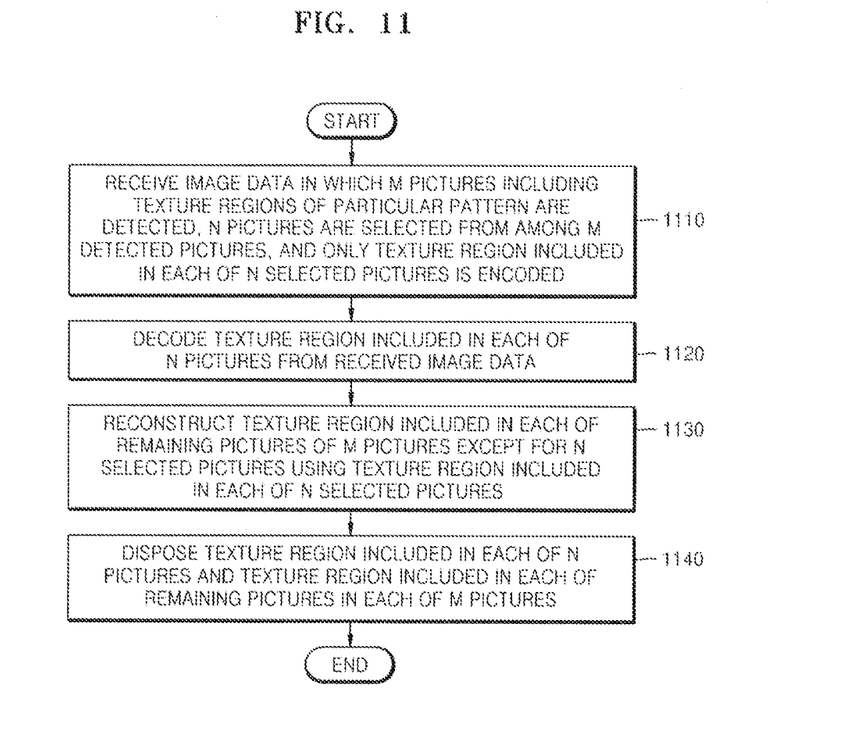
FIG. 11 is a flowchart of an image decoding method according to another exemplary embodiment of the present invention.

FIG. 11 is a flowchart of an image decoding method according to another exemplary embodiment of the present invention.

Referring to FIG. 11, the image decoding apparatus 1000 receives image data in which M pictures, each of which includes a texture region of a particular pattern, are detected, N pictures are selected from among the M detected pictures, and only a texture region included in each of the N pictures is encoded, in operation 1110.

The image decoding apparatus 1000 may receive image data in which a sample texture is selected from the texture region included in each of the N pictures and is encoded.

In operation 1120, the image decoding apparatus 1000 decodes the texture region included in each of the N pictures from the image data received in operation 1110. When only a sample texture in the texture region included in each of the N pictures is encoded, the image decoding apparatus 1000 decodes the sample textures.

In operation 1130, the image decoding apparatus 1000 reconstructs the texture region included in each of the (M-N) pictures using the texture region included in each of the N pictures, which is decoded in operation 1120.

More specifically, the image decoding apparatus 1000 reconstructs the texture region included in each of the remaining (M-N) pictures by performing temporal prediction using the texture region included in each of the N pictures.

When only a sample texture in the texture region included in each of the N pictures is decoded, the image decoding apparatus 1000 synthesizes the texture region included in each of the N pictures using the decoded sample texture and reconstructs the texture region included in each of the (M-N) pictures using the synthesized texture region included in each of the N pictures.

In operation 1140, the image decoding apparatus 1000 disposes the texture region included in each of the N pictures, which has been decoded in operation 1120, and the texture region included in each of the (M-N) pictures, which has been reconstructed in operation 1130, in each of the M pictures.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed over network coupled computer systems so that the computer readable code is stored and executed in a distributed fashion.

As described above, according to the present invention, by efficiently removing temporal/spatial redundancy of texture regions included in an image for encoding/decoding, the compression efficiency of image encoding can be significantly improved.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. An image encoding method comprising:
   detecting a texture region in a current picture;
   selecting only a portion of the detected texture region as a sample texture for synthesizing the texture region, wherein the sample texture is smaller in size than the detected texture region; and
   encoding the selected sample texture in place of the detected texture region,
   wherein the encoding of the selected sample texture comprises encoding position information of the detected texture region and position information of the selected sample texture in the current picture,
   wherein the encoding the selected sample texture comprises generating a prediction value for the sample texture by performing prediction from a previously encoded reference picture and encoding a residual value that is obtained by subtracting the generated prediction value from the sample texture.

2. An image encoding apparatus comprising:
   a texture region detection unit which detects a texture region in a current picture;
   a sample texture selection unit which selects only a portion of the detected texture region as a sample texture for synthesizing the texture region, the sample texture being smaller in size than the detected texture region; and
   an encoding unit which encodes the selected sample texture in place of the detected texture region,
   wherein the encoding unit encodes position information of the detected texture region and position information of the selected sample texture in the current picture,
   wherein the encoding the selected sample texture comprises generating a prediction value for the sample texture by performing prediction from a previously encoded reference picture and encoding a residual value that is obtained by subtracting the generated prediction value from the sample texture.

3. An image decoding method comprising:
   receiving data regarding a current picture in which only a portion of a texture region included in the current picture is selected as a sample texture for synthesizing the texture region, the sample texture being smaller in size than the detected texture region, and the sample texture is encoded in place of the texture region, wherein the sample texture is encoded by encoding a residual value which is a difference between the sample texture and a prediction value generated by a prediction from a previously encoded reference picture;
   decoding the sample texture from the received data regarding the current picture;
   synthesizing the texture region using the decoded sample texture; and
   disposing the synthesized texture region in the current picture,
   wherein the disposing of the synthesized texture region comprises disposing the synthesized texture region by referring to position information of the sample texture in the current picture and position information of the synthesized texture region in the current picture, the position information being included in the received data regarding the current picture.

4. An image decoding apparatus comprising:
   a decoding unit which receives data regarding a current picture in which only a portion of a texture region included in the current picture is selected as a sample texture for synthesizing the texture region, the sample texture being smaller in size than the detected texture region, and the sample texture is encoded in place of the texture region, and decodes the sample texture from the received data regarding the current picture, wherein the sample texture is encoded by encoding a residual value which is a difference between the sample texture and a prediction value generated by a prediction from a previously encoded reference picture;
   a texture region synthesis unit which synthesizes the texture region using the decoded sample texture; and
   a disposition unit which disposes the synthesized texture region in the current picture, wherein the disposition unit disposes the synthesized texture region by referring to position information of the sample texture in the current picture and position information of the synthesized texture region in the current picture, the position information being included in the received data regarding the current picture.

5. A non-transitory computer-readable recording medium having recorded thereon a program for executing by a computer the image encoding method of claim 1.

6. A non-transitory computer-readable recording medium having recorded thereon a program for executing by a computer the image decoding method of claim 3.

* * * * *